United States Patent [19]

Gellert

[11] 4,094,447
[45] June 13, 1978

[54] HEATER CAST FOR MULTI-CAVITY HOT RUNNER EDGE GATE

[76] Inventor: Jobst Ulrich Gellert, 11 Newton Rd., Brampton, Ontario, Canada

[21] Appl. No.: 747,609

[22] Filed: Dec. 6, 1976

[30] Foreign Application Priority Data

Dec. 2, 1976 Canada .................................. 266988

[51] Int. Cl.$^2$ ............................................. B29F 1/02
[52] U.S. Cl. .............................. 222/146 HE; 222/478;
425/568; 425/570
[58] Field of Search ............ 222/146 H, 146 HE, 478, 222/565; 425/542, 568, 569, 570, 571

[56] References Cited

U.S. PATENT DOCUMENTS

| | | | |
|---|---|---|---|
| 2,471,683 | 5/1949 | Halbach | 425/568 X |
| 3,533,594 | 10/1970 | Segmüller | 425/568 X |
| 3,568,256 | 3/1971 | Johnson, Jr. | 425/570 X |
| 3,758,252 | 9/1973 | Kohler | 425/570 |

FOREIGN PATENT DOCUMENTS 976,314 10/1975 Canada .................................. 425/568

*Primary Examiner*—Robert B. Reeves
*Assistant Examiner*—David A. Scherbel

*Attorney, Agent, or Firm*—George H. Riches and Associates

[57] ABSTRACT

This invention relates to an improved heater cast used in multi-cavity hot runner edge gate injection molding. The improved heater cast enables products to be molded of considerably lower heights than was previously the case and as well facilitates the molding of difficult heat sensitive materials such as PVC, polycarbonate, polyester and acetal resins. The improved heater cast has a cylindrical mid portion with four spaced cylindrical lower nozzle portions extending downwardly around the periphery therefrom. The hot melt flows downwardly from the molding machine, through a central injection passage in the heater cast and branches into four injection passage extensions to the respective gates and cavities. The provision of the four lower nozzle portions enables the cavity plate to have a raised table portion therebetween which provides additional strength and cooling. The provision of a cylindrical mid portion enables an extruded cylindrical TEFLON glass filled insulation sleeve to be located between it and the surrounding cavity plate to facilitate faster color and material changes without streaking problems and to be a permanent insulator against heat loss to the cavity plate.

2 Claims, 5 Drawing Figures

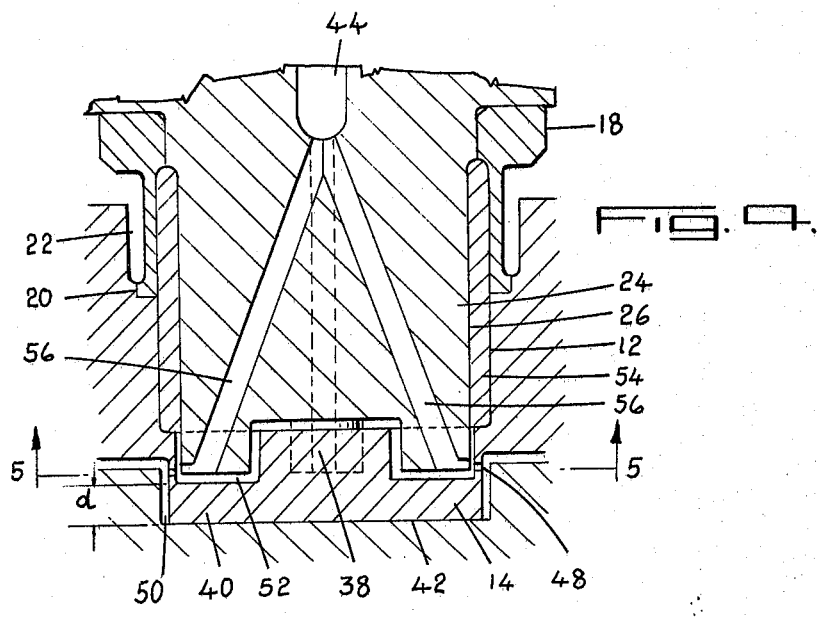
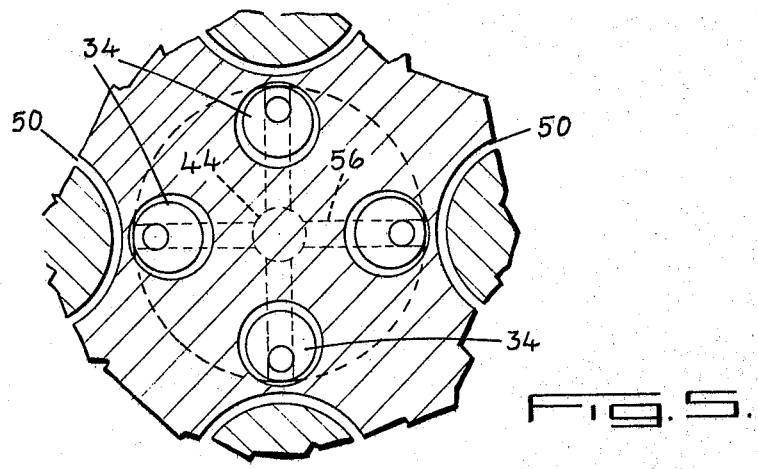

HEATER CAST FOR MULTI-CAVITY HOT RUNNER EDGE GATE

BACKGROUND OF THE INVENTION

This invention relates generally to hot runner systems used to injection mold plastics, and more particularly to an improved heater cast used in multi-cavity hot runner edge gating.

This invention is an improvement over the "Hot Runner Heater" disclosed and claimed in the applicant's Canadian Pat. No. 976,314 which issued Oct. 21, 1975. While that patent discloses a heater having an integral electrical heating element, the present invention may be utilized with structure having a separate heating element. The applicant's prior patent referred to above discloses structure in which hot melt flows downwardly through a central injection passage to the bottom end of a nozzle member and then branches horizontally outward to the gate areas through four equally radially spaced convex portions. As stated in the introductory portion of this earlier patent, this structure was conceived to provide a multi-cavity system with improved heat transfer and heat loss characteristics which are, of course, very critical to operation of the system. However, this previous structure has the disadvantages that it is expensive to manufacture in that it must be milled, and that insufficient strength and cooling is provided by the relatively thin portion of the cavity plate directly between the heater nozzle member and the parting line when molding low height products. For instance, to mold closures or caps with a one-quarter inch high outer wall, the maximum thickness of the portion of cavity plate provided beneath the nozzle member would be only about one-eighth inch. This is unsatisfactory in that it eventually leads to failure of this thin portion of the cavity plate through repeated use or jamming of solidified material in the heater cast well. Furthermore, the flared shape of the heater nozzle member does not facilitate the provision of permanent stable insulation between it and the cavity plate to improve system performance in molding heat sensitive materials such as PVC, polycarbonate, polyester and acetal resins.

SUMMARY OF THE INVENTION

Accordingly, it is an object of the present invention to at least partially overcome these disadvantages by providing an improved heater cast which will economize manufacture, facilitate the provision of stable and stationary insulation for faster colour and material changes and provide for additional strength and increased cooling for molding low height products.

To this end, in one of its aspects, the invention provides an improved heater cast for multi-cavity hot runner edge gate injection molding providing for hot melt to flow downward through a central injection passage to a plurality of peripheral gates, the heater cast comprising a mid portion having a cylindrical outer wall and a substantially flat lower surface, and a corresponding number of spaced lower nozzle portions extending downwardly around the periphery of the mid portion to positions each adjacent one of the gates respectively, each of the lower nozzle portions having a cylindrical outer wall and a substantially flat lower face, each of the lower nozzle portions providing for an injection passage extension for flow of the hot melt to the area of the respective gate.

Further objects and advantages of the invention will appear from the following description taken together with the accompanying drawings.

BRIEF DESCRIPTION OF THE DRAWINGS

FIG. 4 is a partial sectional view similar to FIG. 2 of a heater cast according to a second embodiment of the invention; and FIG. 5 is a sectional view taken along line 5—5 in FIG. 4.

DETAILED DESCRIPTION OF THE DRAWINGS

Figure 1:
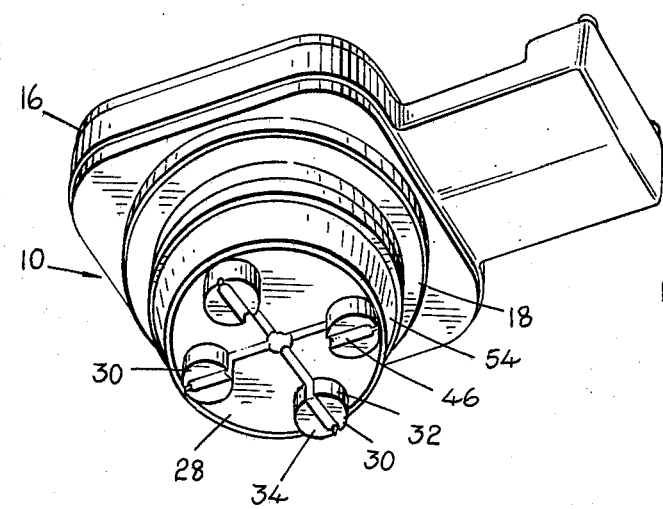
FIG. 1 is a perspective view of a heater cast according to a first embodiment of the invention.
Figure 2:
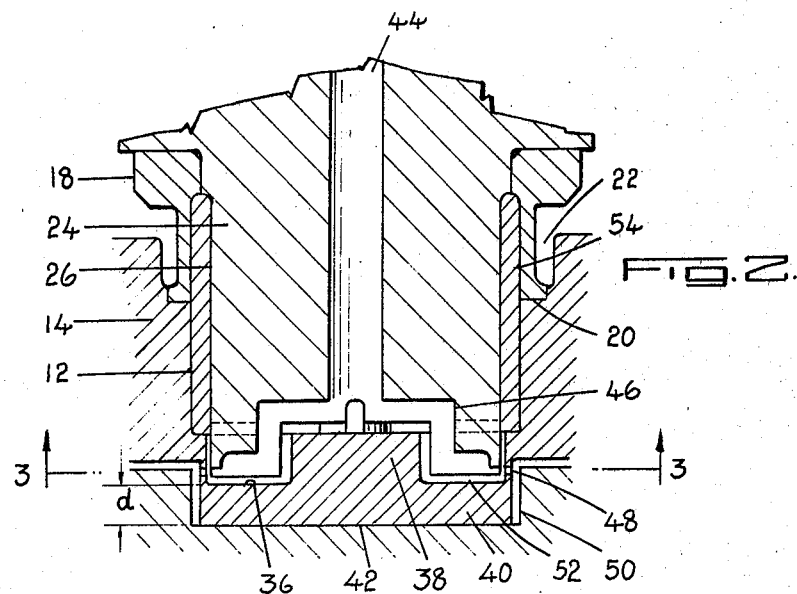
FIG. 2 is a partial sectional view of the embodiment seen in FIG. 1.

Reference is first made to FIGS. 1 and 2 which show the improved heater cast 10 received in the well 12 in the cavity plate 14. In this embodiment, the heater cast 10 has in integral electrical heating element (not shown) in the uppor portion 16. The heater cast 10 is supported in the well by insulation and locating bushing 18 which, with the small exception of seat 20, is insulated from the surrounding cavity plate 14 by air cap 22. The hot heater cast is normally formed of a beryllium copper alloy while the cooled cavity plate 14 is formed of steel. The heat patterns in the relatively small areas surrounding the gates are critical to satisfactory operation of the system (particularly in molding heat sensitive materials) and it is therefore essential that there be sufficient uniform heat transfer downwardly through the heater cast 10 without undue loss to the surrounding cavity plate 14.

Figure 3:
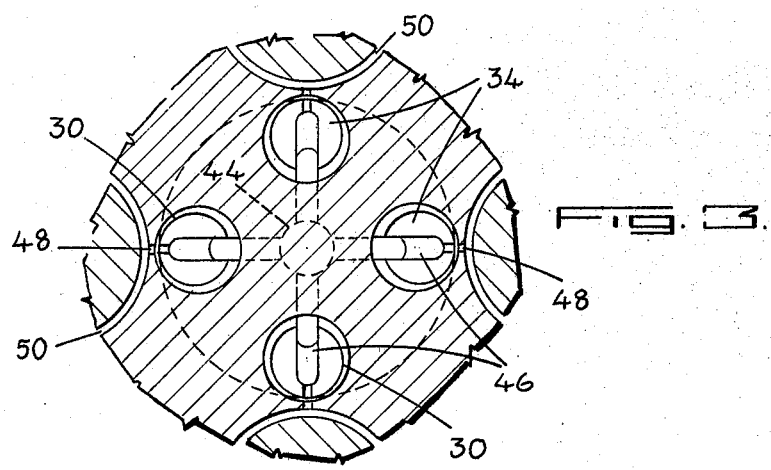
FIG. 3 is a sectional view taken along line 3—3 in FIG. 2.

As seen in FIGS. 2 and 3, the heater cast 10 has a mid portion 24 with a cylindrical outer wall 26 and a substantially flat lower surface 28. Extending downwardly around the periphery of the mid portion 24 are four equally spaced lower nozzle portions 30, each of which also have a cylindrical outer wall 32 and substantially flat lower faces 34. The well 12 which receives the heater cast 10 in the cavity plate 14 has a bottom 36 which defines a central raised table portion 38 extending between the lower nozzle portions 30 of the heater cast 10. Thus the otherwise relatively thin portion 40 of the cavity plate 14 between the heater cast 10 and the parting line 42 is given substantial additional strength by this table portion 38.

The heater cast 10 has a central injection passage 44 which extends downwardly to the lower surface 28 of the mid portion 24 where it connects with four radially extending channels 46. Each of the channels 46 extends outwardly across the lower surface 28 of the mid portion 24, down the inside of the wall 32 of one of the lower nozzle portions 30 and across the lower face 34 of that nozzle portion to the area of the gate 48 which communicates with cavity 50. An insulation space 52 extends between the bottom 36 of the well 12 and the lower nozzle portions 30 and the lower surface 28 of the mid portion 24 of the heater cast 10. This space 52 fills with melt which then solidifies and provides additional insulation between the heater cast 10 and the cavity plate 14. In the case of some of the heat sensitive materials such as PVC, it may be advisable to first shoot nylon through the system, and then remove the nylon runner by mechanical means before molding PVC. This fills insulation space 52 with solidified nylon having a high softening point which has the effect of eliminating dead spots where stale PVC would otherwise be allowed to sit and decompose.

A cylindrical extruded TEFLON (Trade Mark) glass reinforced insulation sleeve 54 is located around the cylindrical outer wall 26 of the mid portion 24 of the heater cast 10. Under operating conditions this sleeve 54 is stably held between the heater cast and the cavity plate to prevent the pressurized melt from entering this area from below. The elimination of melt flowing into this area avoids the problem of stale heat sensitive materials being trapped in this area and decomposing due to heat from the heater cast. While a true air gap insulation would be preferable, the configuration of edge gate molding makes it very difficult to prevent the escape of pressurized melt from the gate into this area. The provision of this insulation sleeve 54 is, of course, facilitated by the cylindrical shape of the outer wall 26 of the mid portion 24 of the heater cast 10. It also permits greater tolerance in the viscosity seal around the gate area without having colour and material change problems i.e. streaking.

In use, melt from the molding machine flows down the central injection passage 44 to the lower surface 28 of the mid portion 24 of the heater cast 10 where it branches outward into the four radial channels 46, through the gates 48 and into the cavities 50. Use of this structure with the cavity plate 14 having the raised table portion 38 beneath the heater cast 10 enables dimension $d$ to be of the order of one-eighth inches without substantial danger of breakage of that portion of the cavity plate 14, as compared to the previously allowable minimum dimension of approximately three-eighths inches with the heater cast 10 having a flat bottom. Thus many low height products may be made with this system which could not be made with previous systems.

Many of the features of the second embodiment of the invention shown in FIGS. 4 and 5 are identical to those of the first embodiment, and therefore features common to both embodiments are described and illustrated using the same reference numerals. In this embodiment, the central injection passage 44 terminates in the mid portion 24 of the heater cast 10 where it communicates with four diagonal passages 56, each of which extends downwardly outward through the remainder of the mid portion 24 and one of the lower nozzle portions 30 to the area of one of the gates 48. Thus, in this embodiment, the melt flows downwardly through the central injection passage 44 and then branches out down the diagonal passages 56, through the gates 48 and into the cavities 50. This embodiment is preferable for the use of materials such as PVC where material shooting of nylon is done because mechanical removal of the nylon is easier as it may be done by drilling rather than milling.

Although the disclosure describes and illustrates two embodiments of the invention, it is to be understood that the invention is not restricted to these particular embodiments. Many variations and modifications will occur to those skilled in the art. For instance, while this system is particularly adapted for molding low height products, it may be used for other products. It is also apparent that the number of cavities need not necessarily be four as shown in the two embodiments described. For a definition of the invention, reference is made to the appended claims.

What I claim is:

1. An improved heater cast for multi-cavity hot runner edge gate injection molding providing for hot melt to flow downward through a central injection passage to a plurality of peripheral gates, the heater cast comprising:
    (a) a mid portion having a cylindrical outer wall and a substantially flat lower surface, and
    (b) a corresponding number of lower nozzle portions extending downwardly from the mid portion to positions each adjacent one of the gates respectively, each of the lower nozzle portions having a cylindrical outer wall and a substantially flat lower face with a radial channel extending across at least a portion of said lower face, the lower nozzle portions being sufficiently smaller in area and sufficiently spaced around the periphery of the mid portion to provide a significant recessed area therebetween;

each of the lower nozzle portions providing for an injection passage extension for flow of the hot melt to the area of the respective gate and wherein the central injection passage terminates in the mid portion of the heater cast at a corresponding number of connecting diagonal passages each of which extends downwardly outward through the mid portion and communicates with said radial channels, whereby the melt branches from the central injection passage through said diagonal passages and said radial channels to the areas of the respective gates.

2. An improved heater cast for multi-cavity hot runner edge gate injection molding providing for hot melt to flow downward through a central injection passage to a plurality of peripheral gates, the heater cast comprising:
    (a) a mid portion having a cylindrical outer wall and a substantially flat lower surface, and
    (b) a corresponding number of spaced lower nozzle portions extending downwardly around the periphery of the mid portion to positions each adjacent one of the gates respectively, each of the lower nozzle portions having a cylindrical outer wall and a substantially flat lower face;

wherein the central injection passage extends downwardly to the lower surface of the mid portion of the heater cast where it communicates with a corresponding number of radial channels each of which extends across the lower surface of the mid portion, down the inside of the wall of a nozzle portion and across the lower face of said nozzle portion, whereby the melt branches from the central injection passage through the channels to the area of each of the respective gates.

* * * * *